United States Patent
Aubreville

(10) Patent No.: US 9,718,348 B2
(45) Date of Patent: Aug. 1, 2017

(54) METHOD OF PRODUCING A DEFLECTOR DEVICE FOR FUEL-REFILLING SYSTEMS AND CONSTRUCTION KIT WITH PREFABRICATED COMPONENTS FOR PRODUCING A DEFLECTOR DEVICE PROTOTYPE

(71) Applicant: Kautex Textron GmbH & Co. KG, Bonn (DE)

(72) Inventor: Simon Aubreville, Cologne (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 31 days.

(21) Appl. No.: 14/357,683

(22) PCT Filed: Oct. 24, 2012

(86) PCT No.: PCT/EP2012/004431
§ 371 (c)(1),
(2) Date: May 12, 2014

(87) PCT Pub. No.: WO2013/068076
PCT Pub. Date: May 16, 2013

(65) Prior Publication Data
US 2014/0312036 A1    Oct. 23, 2014

(30) Foreign Application Priority Data

Nov. 11, 2011 (DE) .................... 10 2011 118 195

(51) Int. Cl.
*B60K 15/04* (2006.01)
*B23P 11/00* (2006.01)
(Continued)

(52) U.S. Cl.
CPC .............. *B60K 15/04* (2013.01); *B23P 11/00* (2013.01); *B62D 65/00* (2013.01); *B62D 65/005* (2013.01);
(Continued)

(58) Field of Classification Search
CPC .... B60K 2015/047; B60K 2015/03019; B60K 2015/03394; B60K 15/04; B60Y 2304/00;
(Continued)

(56) References Cited

U.S. PATENT DOCUMENTS 4,510,353 A * 4/1985 Nemitz ................ H01H 13/702
                                                    200/292
4,718,568 A * 1/1988 Dal Palu ................ B60K 15/04
                                                    138/113

(Continued)

FOREIGN PATENT DOCUMENTS

DE    102005016037 A1    11/2005
WO       03104013 A1    12/2003

OTHER PUBLICATIONS

PCT International Search Report mailed Jan. 28, 2013, received in corresponding PCT Application No. PCT/EP12/04431, 2 pgs.

(Continued)

*Primary Examiner* — Christopher Besler
*Assistant Examiner* — Matthew P Travers
(74) *Attorney, Agent, or Firm* — Grossman Tucker Perreault & Pfleger, PLLC

(57) ABSTRACT

A method of producing a deflector device for a fuel tank system comprising producing a deflector device prototype from prefabricated components of a construction kit, performing fuel-refilling tests using the deflector device prototype, optionally modifying the deflector device prototype, creating a construction model for the deflector device prototype, producing a deflector device according to the con- (Continued)

struction model, optionally performing fuel-refilling tests with the deflector device produced according to the construction model and optionally producing the deflector device according to the construction model. The disclosure further provides a construction kit with prefabricated components for producing the prototype of the deflector device for the fuel tank system.

11 Claims, 4 Drawing Sheets

(51) Int. Cl.
*B62D 65/00* (2006.01)
*B33Y 80/00* (2015.01)
*B33Y 10/00* (2015.01)
B33Y 50/00 (2015.01)
B60K 15/03 (2006.01)

(52) U.S. Cl.
CPC ............ *B23P 2700/50* (2013.01); *B33Y 10/00* (2014.12); *B33Y 50/00* (2014.12); *B33Y 80/00* (2014.12); *B60K 2015/03019* (2013.01); *B60K 2015/03394* (2013.01); *B60K 2015/047* (2013.01); *B60K 2015/0458* (2013.01); *B60K 2015/0461* (2013.01); *B60Y 2304/00* (2013.01); *B60Y 2304/05* (2013.01); *B60Y 2304/09* (2013.01); *Y10T 29/49622* (2015.01); *Y10T 29/49778* (2015.01)

(58) Field of Classification Search
CPC ............ B60Y 2304/05; B60Y 2304/09; B60Y 2410/12; B23P 11/00; B23P 2700/50; B33Y 10/00; B33Y 50/00–50/02; B33Y 80/00; B33Y 99/00; Y10T 29/49622; B29L 2031/40
See application file for complete search history.

(56) References Cited

U.S. PATENT DOCUMENTS

| 5,003,498 | A | 3/1991 | Ota et al. |
| 5,339,219 | A * | 8/1994 | Urich .................. H05K 7/1441 |
| | | | 174/261 |
| 5,819,388 | A | 10/1998 | Salm |
| 5,996,622 | A | 12/1999 | Cimminelli et al. |
| 6,705,383 | B2 | 3/2004 | Beeck et al. |
| 7,857,016 | B2 | 12/2010 | Baudoux |
| 8,220,508 | B2 | 7/2012 | Rongstock |
| 8,412,588 | B1 * | 4/2013 | Bodell .................. G06Q 10/06 |
| | | | 700/119 |
| 2002/0067228 | A1 * | 6/2002 | Hoffman ............... H01P 1/2053 |
| | | | 333/202 |
| 2007/0124018 | A1 * | 5/2007 | Parmenter ........... B29C 45/2602 |
| | | | 700/182 |

OTHER PUBLICATIONS

PCT Written Opinion mailed Jan. 28, 2013, received in corresponding PCT Application No. PCT/EP12/04431, 5 pgs.

* cited by examiner

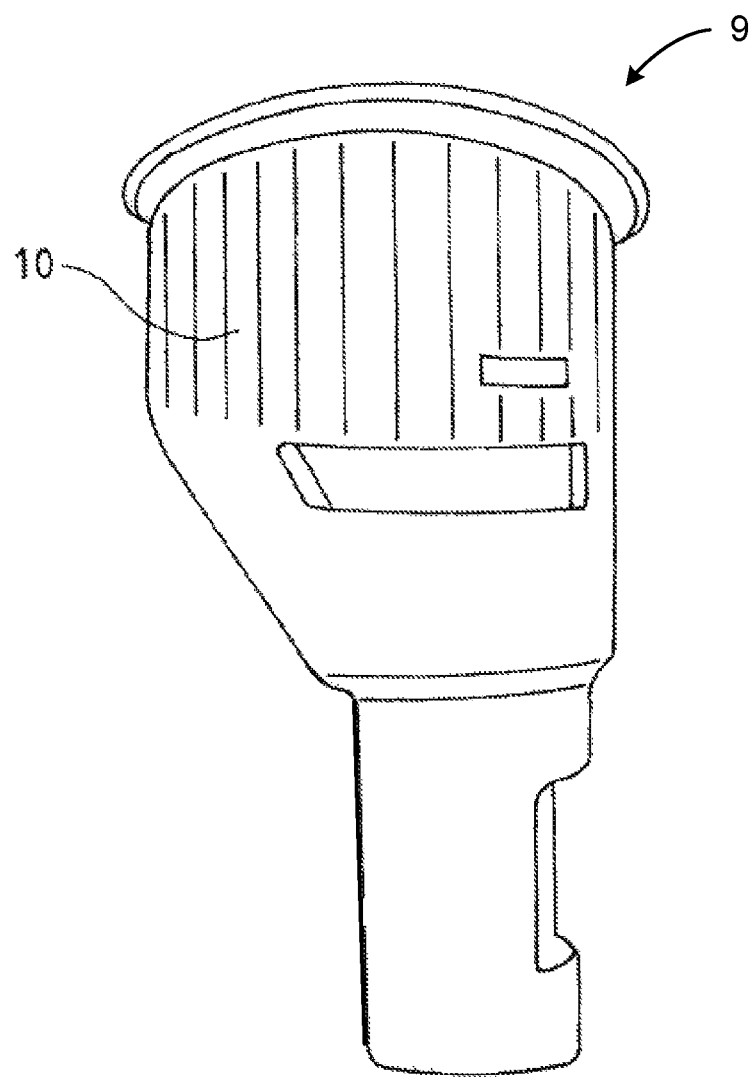

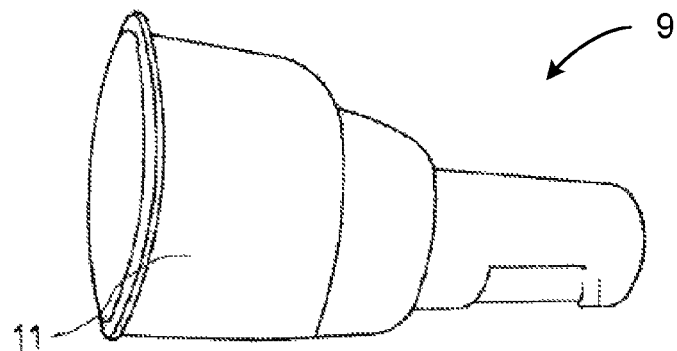
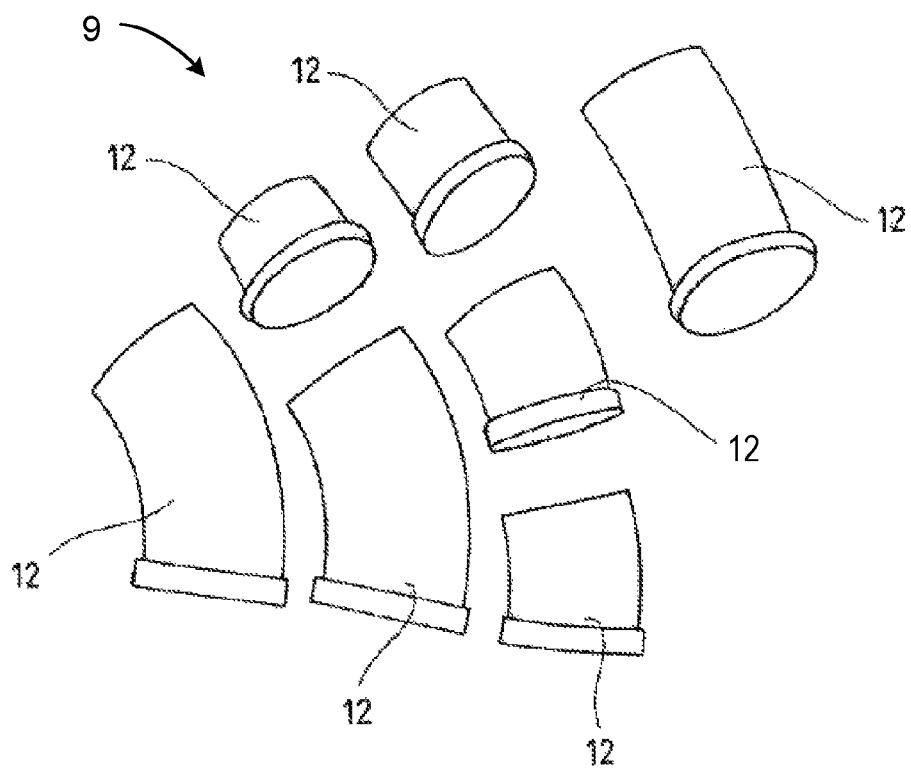

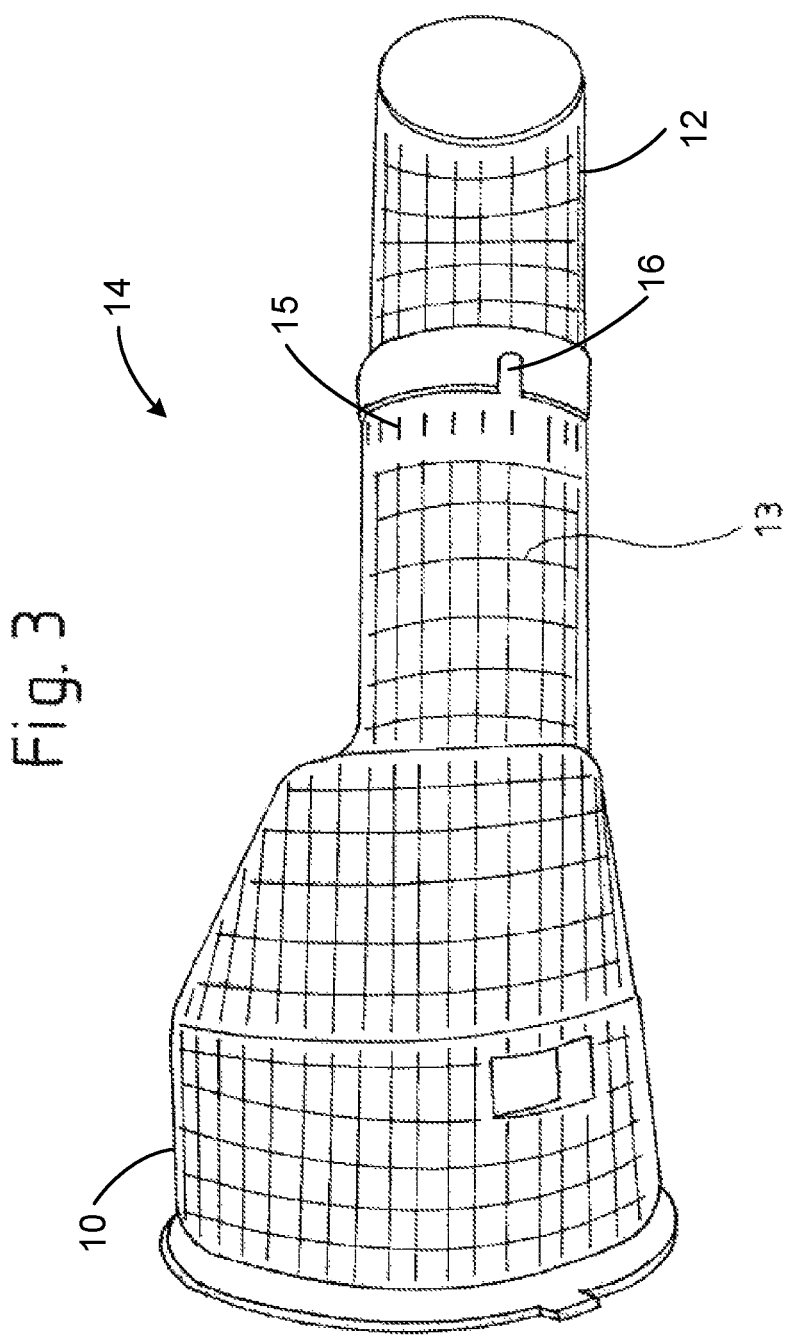

METHOD OF PRODUCING A DEFLECTOR DEVICE FOR FUEL-REFILLING SYSTEMS AND CONSTRUCTION KIT WITH PREFABRICATED COMPONENTS FOR PRODUCING A DEFLECTOR DEVICE PROTOTYPE

The invention relates to a method of producing deflector devices for fuel-refilling systems. The invention further relates to a construction kit with prefabricated components for producing a deflector device prototype for fuel-refilling systems.

Deflector devices integrated in fuel tank systems are used to position the nozzle reliably in the filler neck and to prevent the fuel from expanding and foaming back when filling up, which can lead to the fuel-refilling process being ended prematurely. The deflector devices in this case are individually developed, constructed and tested for each newly constructed fuel tank system.

With the method of producing deflector devices for fuel tank systems known in the art, a prototype was produced at a first stage using deflector sections from pre-produced fuel tank systems, wherein deflector sections from the pre-produced fuel tank systems were bonded together. The prototype produced was then used to perform fuel-refilling tests and was modified until the fuel-refilling result met all the requirements. The prototype thereby created was scanned and recorded by means of a 3D scanner. The point cloud resulting from the 3D scan was used to produce a construction model, for example a CAD model. This construction model was used to produce a prototype by means of a laser sintering process, wherein this prototype was usually produced by an external supplier. For different reasons, such as limitations within the production process, for example, the prototype produced according to the construction model did not correspond to the original prototype, which was produced using deflector sections from pre-produced fuel tank systems. The prototype produced according to the construction model therefore had to be checked using further fuel-refilling tests. The prototype produced according to the construction model had to be recalibrated following modification, in order to produce a new construction model and to produce a prototype on the basis thereof. This process was repeated until the prototype produced according to the construction model met all the requirements. A mould was then produced in order to manufacture the deflector device in series by injection moulding. At a final stage, the deflector devices created by means of the mould were tested with further fuel-filling tests.

In the case of the method known in the art for the production of deflector devices for fuel tank systems, a plurality of prototypes normally had to be produced by laser sintering, as the combination of different deflector sections from different pre-produced fuel tank systems could result in a form that was not producible by injection moulding. Consequently, the newly constructed part did not correspond to the tested part. The production of a plurality of prototypes, the calibration and construction thereof and also the production thereof by laser sintering resulted in a long, high-cost development process.

The invention therefore addresses the problem of simplifying methods of producing deflector devices for fuel tank systems and shortening the development time for the deflector device for fuel tank systems.

The problem is solved by a method of producing deflector devices for fuel tank systems comprising the following steps:

production of a deflector device prototype from prefabricated components of a construction kit,
performance of fuel-refilling tests using the deflector device prototype,
possible modification of the deflector device prototype,
creation of a construction model for the deflector device prototype,
production of a deflector device according to the construction model,
optional performance of fuel-refilling tests with the deflector device produced according to the construction model
and
preferably series production of the deflector device according to the construction model.

The method according to the invention is based on the deflector device prototype being composed of prefabricated components of a construction kit. This particularly simplifies the creation of the construction model for the deflector device prototype, as only prefabricated components of a construction kit are used. Consequently, the deflector device subsequently produced according to the construction model corresponds precisely to the deflector device prototype made up of prefabricated components from the construction kit. Fuel-refilling tests may be optionally conducted to check again that the deflector device produced according to the construction model meets all the requirements for deflector devices. The construction model created is preferably used subsequently for series production of the deflector device, for example by means of injection moulding. Series production of the deflector device may also be undertaken by an outside supplier. The development time is considerably reduced by the method of producing deflector devices for fuel tank systems according to the invention, as there is no need for a plurality of prototypes to be produced by laser sintering.

According to a variant of the method according to the invention, the construction kit for producing the deflector device prototype exhibits prefabricated deflector base bodies, prefabricated inserts for the deflector base bodies for receiving a filler neck and prefabricated bends with different radii and/or lengths. The base bodies exhibit an expanded area in which the inserts can be used. The internal geometry of the expanded area is preferably standardized. Furthermore, the base body exhibits a cylindrical area, wherein the length and the setting angle differ between the different base body designs. The prefabricated components of the construction kit are preferably designed such that they can be produced subsequently by injection moulding, so that there are no differences between the prototypes made up of prefabricated components from the construction kit and the deflector devices produced according to the construction model.

In a variant of the method according to the invention, the prefabricated components of the construction kit are made of plastic, metal, casting compound such as epoxy resin, for example, or glass.

In a further variant of the method according to the invention, the prefabricated components of the construction kit are produced by a rapid prototyping method, such as stereolithography, injection moulding, milling, turning, vacuum blowing and/or laser sintering, wherein the production method used depends for example on the material of the prefabricated component from the construction kit.

In a preferred variant of the invention, the construction models for the prefabricated components of the construction kit are stored on a computer facility, wherein the construction model of the deflector device prototype is created by means of the construction models of the prefabricated components of the construction kit, which were used to produce the deflector device prototype. Since a construction model was stored on the computer facility for each of the individual prefabricated components of the construction kit, the construction model for the deflector device prototype can easily be created by combining the construction models for the prefabricated components of the construction kit. In particular, scanning of the deflector device prototype is thereby avoided.

In accordance with a further variant of the invention, the prefabricated components of the construction kit are provided with grid lines. By means of these grid lines, modifications to the prefabricated components of the construction kit can easily be recorded during production of the deflector device prototype and integrated into the construction model.

Transferring the modification to the prefabricated components of the construction kit to the construction model for the deflector device prototype by means of the grid lines thereby enables the prefabricated components of the construction kit to be adapted according to the invention without the deflector device prototype created having to be scanned by means of a 3D scanner to create the construction model.

In a further variant of the method according to the invention, the position of the prefabricated components of the construction kit used to produce the deflector device prototype relative to one another is determined by means of a scale applied to a prefabricated component, such as the deflector base body, for example, and a marking applied to a component connected thereto, such as a bend, for example. Alternatively, a marking is applied to the deflector body, for example, and the component connected thereto, such as a bend, exhibits a scale. The deflector base body advantageously displays a scale, for example, in the area in which a bend is attached to the deflector base body and the bend attached to the deflector base body exhibits a marking in the area of the connection with the deflector base body. By determining the position of the marking on the scale, the position of the components of the construction kit relative to one another can thereby be easily determined and transferred to the construction model.

In an advantageous variant, the prefabricated components used to produce the prototype are detachably connected to one another, using the tongue-and-groove principle, for example. The deflector device prototype can thereby be easily produced from prefabricated components of the construction kit. The prototype can easily be adapted by exchanging the prefabricated components of the construction kit due to the detachable connection of the components of the construction kit to one another, until the fuel-refilling tests meet all the requirements for the deflector device.

The invention further relates to a construction kit with prefabricated components for the production of a prototype of a deflector device for fuel tank systems comprising:

at least two prefabricated deflector base bodies;
at least two prefabricated inserts for the deflector base bodies, designed to receive a filler neck;
at least two prefabricated bends with different radii and/or lengths.

By means of a construction kit of this kind according to the invention with prefabricated components, a prototype of a deflector device for fuel tank systems can be produced for the method according to the invention for producing deflector devices for fuel tank systems. Using the construction kit according to the invention with prefabricated components has the advantage that a construction model of the deflector device prototype can then easily be produced and said prototype is producible by injection moulding, for example.

In a variant of the construction kit according to the invention, the prefabricated components of the construction kit are made of plastic, metal, a casting resin such as epoxy resin, for example, or glass and are produced by a rapid prototyping method, such as stereolithography, injection moulding, milling, turning, vacuum blowing and/or laser sintering, for example. The prototype can therefore be produced subsequently according to one of the aforementioned methods from one of the aforementioned materials.

In a preferred variant of the construction kit according to the invention, the components of the construction kit exhibit grid lines on their surface, at least in part. By means of these grid lines, modifications to the components of the construction kit can be transferred to the construction model of the prototype, without the prototype having to be scanned by means of a 3D scanner.

According to a further preferred variant of the construction kit according to the invention, the components of the construction kit exhibit a scale or a marking at least in part, wherein the marking of the one fitted component is disposed following assembly with a further component in close proximity to the scale of said further component. The position of the components of the construction kit can thereby be determined relative to one another following creation of the deflector device prototype and transferred to the construction model.

In an advantageous variant of the construction kit according to the invention, a prefabricated deflector base body of the construction kit exhibits a scale at the end which is connected to a bend, and the bend exhibits a marking at the end which is connected to the deflector base body. The scale and marking therefore lie in close proximity to one another and the position of the deflector base body and the bend attached thereto relative to one another can be determined easily and precisely.

According to a further variant of the construction kit according to the invention, the construction kit components are detachably connected to one another by means of a tongue-and-groove system, for example. This makes it easier for a prototype to be produced until it meets all the requirements for the deflector device being produced in fuel-refilling tests, wherein the components used from the construction kit can easily be exchanged to produce the prototype.

In accordance with a further variant of the construction kit according to the invention, attachment points are provided within the deflector base body and/or the insert, in order to arrange an element between two internal faces of the deflector base body and/or of the insert. For example, the attachment points are in the form of recesses in the wall of the deflector base body or of the insert and the element is a web that can be clamped into said recesses. By means of the element disposed within the deflector base body and/or the insert, a filler neck introduced therein can be at least partly fixed and/or the penetration depth of the filler neck can be limited. For improved fixing, the inserted element may be additionally bonded or welded to the inner wall of the deflector base body or of the insert. The inserted element may exhibit a plurality of forms, although it is preferably configured as a web.

The invention is explained in greater detail below with the help of the exemplary embodiments shown in the figures.

In the figures:

FIGS. 2a to 2c show prefabricated components of a construction kit according to the invention and FIG. 3 shows a prototype of a deflector device made up of prefabricated components from a construction kit.

Figure 1:
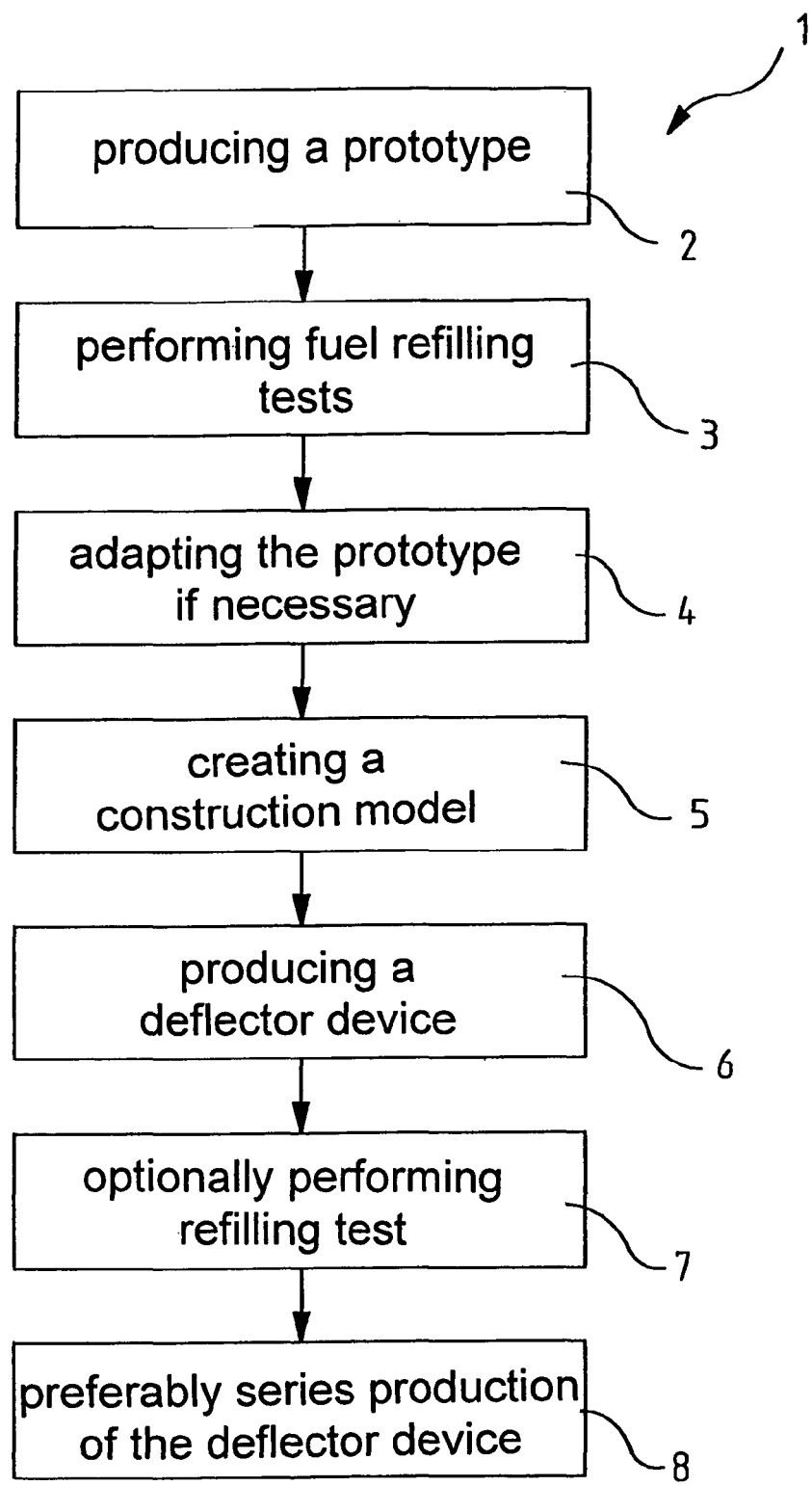
FIG. 1 shows a flow diagram of a method according to the invention.

FIG. 1 shows the flow of a method 1 according to the invention for producing a deflector device for fuel tank systems. At a first stage 2 a prototype 14 of a deflector device is produced from prefabricated components 10, 11, 12 from a construction kit 9. Fuel-refilling tests 3 are then conducted using the prototypes 14 of the deflector device. If the prototype 14 of the deflector device should fail to meet all the requirements for the deflector device, said prototype 14 of the deflector device is adapted 4 until it meets all the requirements for the deflector device in the tank-refilling tests 3 performed. For prototypes 14 of the deflector device, which satisfy all requirements for the deflector device, a construction model 5 is created. Using the construction model, a deflector device is produced 6 which is optionally rechecked by conducting further fuel-refilling tests 7, to see whether all requirements for deflector devices have been fulfilled.

With the help of the construction model created, series production 8 of the deflector device according to the construction model may preferably take place.

The advantageous feature of the method 1 according to the invention is that the prototype 14 of the deflector device is made 2 of prefabricated components 10, 11, 12 from a construction kit 9. The prefabricated components 10, 11, 12 from the construction kit 9 are configured such that the prototype 14 produced therefrom is producible in production terms by means of injection moulding, for example. It is thereby achieved that the deflector device produced according to the construction model for the prototype 14 of the deflector device corresponds to the prototype and does not require modification on account of production requirements. This results in a significant reduction in development time for the deflector device for fuel tank systems.

The construction kit 9 for production 2 of the prototype 14 of the deflector device exhibits prefabricated deflector base bodies 10, prefabricated inserts 11 for the deflector base body 10 for receiving a filler neck and prefabricated bends 12 with different radii and/or lengths.

The prefabricated components 10, 11, 12 of the construction kit 9 are produced from plastic, metal or casting compound such as epoxy resin, for example, or glass according to a rapid prototyping method, for example, such as stereolithography, injection moulding, milling, turning, vacuum blowing and/or laser sintering.

Construction models for the prefabricated components 10, 11, 12 of the construction kit 9 are preferably stored in a computer facility, wherein the construction model for the prototype 14 of the deflector device is created by means of the construction models of the prefabricated components 10, 11, 12 from the construction kit 9, which were used for production 2 of the prototype 14 of the deflector device. Since a construction model is stored in the computer facility for each prefabricated component 10, 11, 12 of the construction kit 9, the construction model for the prototype 14 of the deflector device can easily be created by combining the construction models for the prefabricated components 10, 11, 12 from the construction kit 9, which were used in the production 2 of the prototype 14 of the deflector device.

The prefabricated components 10, 11, 12 of the construction kit 9 are provided with grid lines 13, at least in part. By means of these grid lines 13, modifications to the prefabricated components 10, 11, 12 of the construction kit 9 can be transferred to the construction model for the prototype.

Modifications of this kind to the prefabricated components 10, 11, 12 of the construction kit 9 may, for example, be openings in the peripheral walls.

The position of the prefabricated components 10, 11, 12 of the construction kit 9 relative to one another, which were used to produce 2 the prototype 14 of the deflector device, is determined by means of a scale 15 applied to a prefabricated component 10, 11, 12, such as the deflector base body 10, for example, and a marking applied to a component 10, 11, 12 connected thereto, such as a bend 12, for example. This alignment of the prefabricated components 10, 11, 12 from the construction kit 9, which were used to produce 2 the prototype 14 of the deflector device, may be transferred into the construction model for the prototype 14.

The prefabricated components 10, 11, 12 from the construction kit used to produce 2 the prototype 14 are detachably connected to one another using the tongue-and-groove principle, for example. The prototype 14 of the deflector device can thereby be easily adapted 4.

Illustrated in FIGS. 2a to 2c is a construction kit 9 according to the invention with prefabricated components 10, 11, 12 for the production of a prototype of a deflector device for fuel tank systems. The prototype 14 of the deflector device for fuel tank systems is preferably produced according to the method described above in this case. The construction kit 9 comprises at least two prefabricated deflector base bodies 10, wherein an exemplary prefabricated deflector base body 10 is illustrated in FIG. 2a. The deflector base body 10 exhibits an upper expanded area in which an insert 11 can be used. The deflector base body 10 subsequently exhibits a conical area and a lower cylindrical area.

The construction kit 9 according to the invention further comprises at least two prefabricated inserts 11 for the deflector base body 10 configured to receive a filler neck. An exemplary insert 11 for the deflector base body 10 is depicted in FIG. 2b.

The internal geometry of the deflector base body 10 and the external geometry of the inserts 11 are preferably coordinated with one another in this case, such that all prefabricated inserts 11 can be used in all prefabricated deflector base bodies 10.

The construction kit 9 according to the invention further comprises at least two prefabricated bends 12 with different radii and/or lengths. Exemplary prefabricated bends 12 are depicted in FIG. 2c.

By means of the construction kit 9 according to the invention with prefabricated components 10, 11, 12, shown in FIGS. 2a to 2c, a prototype 14 of a deflector device for fuel tank systems can be created, as with the implementation of the previously described method according to the invention.

The prefabricated components 10, 11, 12 of the construction kit 9 may be made of plastic, metal, a casting compound such as epoxy resin, for example, or glass and depending on the material used are produced by a rapid prototyping method such as stereolithography, injection moulding, milling, turning, vacuum blowing and/or laser sintering, for example.

FIG. 3 shows a prototype 14 of a deflector device for fuel tank systems. The prototype 14 is made up of a prefabricated deflector base body 10, a prefabricated insert 11 and a prefabricated bend 12 from the construction kit 9 according to the invention.

As shown in FIG. 3, the components 10, 11, 12 of the construction kit 9 comprise grid lines on their surface, at least in part. By means of the grid lines 13 on the surface of the prefabricated components 10, 11, 12 of the construction kit 9, modifications to the prefabricated components 10, 11, 12 of the construction kit 9 can be transferred to the construction model for the prototype 14 of the deflector device.

The components 10, 11, 12 of the construction kit 9 exhibit at least in part a scale 15 or a marking 16, wherein the marking 16 of the one component 12 is disposed following assembly with a further component 10 in close proximity to the scale 15 of said further component 10. As shown in FIG. 3, the deflector base body 10 exhibits a scale 15 on the end, which is connected to a bend 12 and the bend 12 exhibits a marking 16 on the end, which is connected to the deflector base body 10. The position of the deflector base body 10 in relation to the bend 12 can therefore be determined using the scale 15 and the marking and transferred to the construction model for the prototype 14.

The components 10, 11, 12 of the construction kit 9 according to the invention are configured such that they can be detachably connected to one another, for example by means of a tongue-and-groove system. Consequently, a prototype created by means of components 10, 11, 12 from the construction kit 9 according to the invention, as shown in FIG. 3, for example, can be adapted by exchanging individual components 10, 11, 12 of the construction kit 9.

REFERENCE NUMBER LIST

1. Method
2. Production of a prototype
3. Fuel-refilling tests
4. Possible modification of the prototype
5. Creation of a construction model
6. Production of a deflector device
7. Optional fuel-refilling tests
8. Series production
9. Construction kit with prefabricated components
10. Deflector base body
11. Insert for deflector base body
12. Bend
13. Grid lines
14. Prototype
15. Scale
16. Marking

What is claimed is:

1. A method of producing a deflector device for a fuel tank system comprising the following steps:
    producing a deflector device prototype from prefabricated deflector device components of a construction kit,
    performing fuel-refilling tests using the deflector device prototype,
    determining a position of each of the prefabricated components of the construction kit used to produce the deflector device prototype relative to one another using a scale having a plurality of marking lines arranged circumferentially on one of the prefabricated components,
    creating a construction model for the deflector device prototype,
    producing at least one deflector device according to the construction model,
    wherein the prefabricated components of the construction kit comprise at least two prefabricated deflector base bodies, at least two prefabricated inserts for the deflector base bodies designed to receive a filler neck and at least two prefabricated bends, wherein the at least two prefabricated bends have at least one of different radii and different lengths.

2. The method according to claim 1, wherein the prefabricated components of the construction kit are made of at least one of plastic, metal, casting resin and glass.

3. The method according to claim 1, wherein the prefabricated components of the construction kit are produced by at least one of stereolithography, injection moulding, milling, turning, vacuum blowing and laser sintering.

4. The method according to claim 1, wherein the prefabricated components of the construction kit each have a construction model and the construction models for the prefabricated components of the construction kit are stored on a computer facility, wherein the construction model of the deflector device prototype is created using the construction models of the prefabricated components of the construction kit used to produce the deflector device prototype.

5. The method according to claim 1, wherein the prefabricated components of the construction kit are provided with grid lines on at least part of their surface.

6. The method according to claim 5, further comprising modifying the prefabricated components of the construction kit, and wherein the modifications to the prefabricated components of the construction kit are transferrable to the construction model for the deflector device prototype by using the grid lines.

7. The method according to claim 1, wherein determining the position of each of the prefabricated components of the construction kit used to produce the deflector device prototype relative to one another further comprises using a marking applied to another of the prefabricated components connected thereto.

8. The method according to claim 1, wherein the prefabricated components of the construction kit used to produce the prototype are detachably connected to one another.

9. The method according to claim 1, further comprising modifying the deflector device prototype after performing fuel-refilling tests using the deflector device prototype and before creating a model for the deflector device prototype.

10. The method according to claim 1, further comprising performing fuel-refilling tests with the at least one deflector device produced according to the construction model after producing the at least one deflector device according to the construction model.

11. The method according to claim 1, further comprising producing a plurality of deflector devices according to the construction model.

* * * * *